(12) United States Patent
Kohli

(10) Patent No.: US 8,518,208 B2
(45) Date of Patent: Aug. 27, 2013

(54) HIGH PERFORMANCE ADHESIVE COMPOSITIONS

(75) Inventor: Dalip Kohli, Churchville, MD (US)

(73) Assignee: Cytec Technology Corp., Wilmington, DE (US)

( * ) Notice: Subject to any disclaimer, the term of this patent is extended or adjusted under 35 U.S.C. 154(b) by 321 days.

(21) Appl. No.: 12/868,836

(22) Filed: Aug. 26, 2010

(65) Prior Publication Data

US 2011/0048637 A1 Mar. 3, 2011

Related U.S. Application Data

(60) Provisional application No. 61/238,560, filed on Aug. 31, 2009.

(51) Int. Cl.
*C09J 163/00* (2006.01)
*B32B 27/38* (2006.01)
*C08L 63/00* (2006.01)
*C08G 59/20* (2006.01)
*C08G 59/50* (2006.01)

(52) U.S. Cl.
USPC .............. 156/330; 156/330.9; 156/331.1; 428/413; 428/417; 523/427; 523/428; 523/440; 525/523; 525/524; 525/525; 525/526

(58) Field of Classification Search
None
See application file for complete search history.

(56) References Cited

U.S. PATENT DOCUMENTS

| | | |
|---|---|---|
| 3,647,751 A | 3/1972 | Darsow |
| 3,985,703 A | 10/1976 | Ferry et al. |
| 4,175,175 A | 11/1979 | Johnson et al. |
| 4,180,529 A | 12/1979 | Hofmann |
| 4,315,085 A | 2/1982 | Ozari et al. |
| 4,419,496 A | 12/1983 | Henton et al. |
| 4,656,208 A | 4/1987 | Chu et al. |
| 4,778,851 A | 10/1988 | Henton et al. |
| 4,977,218 A * | 12/1990 | Gardner et al. ............ 525/329.3 |
| 5,028,478 A | 7/1991 | Odagiri et al. |
| 5,084,532 A | 1/1992 | Schenkel |
| 5,087,657 A | 2/1992 | Qureshi et al. |
| 5,089,560 A | 2/1992 | Gardner et al. |
| 5,223,586 A | 6/1993 | Mautner et al. |
| 5,242,748 A | 9/1993 | Folda et al. |
| 5,266,610 A | 11/1993 | Malhotra et al. |
| 5,278,257 A | 1/1994 | Mulhaupt et al. |
| 5,290,857 A | 3/1994 | Ashida et al. |
| 5,334,654 A | 8/1994 | Starner et al. |
| 5,534,594 A | 7/1996 | Troy et al. |
| 5,605,745 A | 2/1997 | Recker et al. |
| 5,686,509 A | 11/1997 | Nakayama et al. |
| 5,789,482 A | 8/1998 | Eldin et al. |
| 5,981,659 A | 11/1999 | Geck et al. |
| 6,015,865 A | 1/2000 | Blank et al. |
| 6,037,392 A | 3/2000 | Tang et al. |
| 6,111,015 A | 8/2000 | Eldin et al. |
| 6,147,142 A | 11/2000 | Geck et al. |
| 6,180,693 B1 | 1/2001 | Tang et al. |
| 6,261,675 B1 * | 7/2001 | Hsiao et al. ................... 428/219 |
| 6,331,580 B1 | 12/2001 | Molnar |
| 6,776,869 B1 | 8/2004 | Schenkel |
| 6,884,854 B2 | 4/2005 | Schoenfeld et al. |
| 2004/0034124 A1 * | 2/2004 | Court et al. ................... 523/400 |
| 2005/0022929 A1 | 2/2005 | Schoenfeld et al. |
| 2005/0124761 A1 | 6/2005 | Schultes et al. |
| 2006/0079609 A1 | 4/2006 | Nishioka et al. |
| 2008/0188609 A1 | 8/2008 | Agarwal et al. |

FOREIGN PATENT DOCUMENTS

| | | |
|---|---|---|
| EP | 1632533 A1 | 3/2006 |
| WO | 2008087467 A1 | 7/2008 |

OTHER PUBLICATIONS

International Search Report for PCT/US2010/046798, mailed on Dec. 23, 2010.

* cited by examiner

*Primary Examiner* — Michael J Feely
(74) *Attorney, Agent, or Firm* — Thi D. Dang

(57) ABSTRACT

Thermosetting adhesive compositions formed from an epoxy resin containing nano-sized core-shell particles, one or more thermoplastic toughening agent containing an amine-terminated polyethersulfone, and at least one multi-functional epoxy resin, together with at least one amine curing agent to allow full cure of the adhesive composition up to 400° F. are provided herein. Such compositions are useful for forming adhesive films that can bond composite/metal/honeycomb structures for aerospace including bonding of aircraft leading or trailing edges, acoustic nacelle structures, horizontal and vertical tail, and various other structures, as well as for other high performance industrial applications.

17 Claims, 2 Drawing Sheets

US 8,518,208 B2

HIGH PERFORMANCE ADHESIVE COMPOSITIONS

CROSS-REFERENCE TO RELATED APPLICATIONS

This application claims benefit of priority from U.S. Provisional Application No. 61/238,560 filed Aug. 31, 2009 the content of which is incorporated herein by reference in its entirety.

BACKGROUND OF THE INVENTION

1. Field of the Invention

The subject matter of the present invention relates to modified epoxy thermosetting adhesive compositions useful for bonding of various composite or metal substrates, and having improved characteristics. More particularly, the subject matter relates to thermosetting compositions containing nano-sized core-shell particles in combination with elastomers and/or thermoplastics, to provide synergistic and superior toughness, high temperature shear properties, high glass transition temperature, and low water absorption. These new compositions are suitable for hostile environments and demanding applications in various industries, as structural adhesives and matrix resins for fiber reinforced epoxy prepregs.

2. Description of the Related Art

Numerous compositions and processes are described in the art for making and using a wide variety of epoxy-based compositions and other resins and additives in an effort to improve the shear strength, impact resistance and other key properties of adhesives useful in adhering, filling and making composite and metal structures. For example, patents which describe components for the formulation of adhesive compositions and the use of such compositions to adhere various substrates to each other and to provide structural reinforcement include U.S. Pat. Nos. 5,028,478; 5,087,657; 5,242,748; 5,278,257; 5,290,857; 5,605,745; 5,686,509; 5,334,654; 6,015,865; 6,037,392; 6,884,854; and 6,776,869; and U.S. Patent Application Publication Nos. 2005/0022929; and 2008/0188609.

Although adhesive compositions and composite structures with improved toughness have been disclosed previously, there has been some sacrifice with regard to other physical properties of the compositions, including, for example, a reduction in glass transition temperatures together with an increase in creep at high temperatures. For example, adhesive compositions to date suffer from a decrease in high temperature properties (e.g., shear properties) as the toughness (peel) is increased. Further difficulties with such adhesive compositions and composites can include a loss in stiffness, adhesive failure that occurs between substrates formed of dissimilar materials and/or resins, and property deterioration during use due to poor solvent resistance.

Accordingly, the adhesive compositions and methods presently available for producing toughened composites and for bonding of various composite and/or metal substrates require further improvement. Thermosetting adhesive compositions having improved resistance to impact, and having improved toughness and shear properties at high temperatures would be a useful advance in the art and could find rapid acceptance in the aerospace and high performance automotive industries, among others.

SUMMARY OF THE INVENTION

The invention described herein is directed, in one aspect, to thermosetting adhesive compositions having a prereact composition formed by reacting an epoxy resin containing nano-sized core-shell particles, one or more thermoplastic modifiers containing an amine-terminated polyethersulfone and/or an amine-terminated polysulfone, and at least one multifunctional epoxy resin, together with at least one amine curing agent to allow full cure of the adhesive composition up to 400° F. The nano-sized core-shell particles used in conjunction with the indicated thermoplastic provide the unexpected benefit of high temperature shear properties without the loss of toughness. The unique combination of higher toughness and higher temperature performance represents a new paradigm shift in properties and a departure from those compositions of the prior art, which suffer from a decrease in higher temperature properties as toughness is increased.

In one embodiment, the prereact of the thermosetting adhesive composition can further include a bisphenol and a catalyst for the bisphenol-epoxy reaction to control the crosslink density.

In another aspect, the invention provides thermosetting adhesive films suitable for fabricating an article such as by bonding various substrates together, wherein the film includes a thermosetting adhesive composition as described herein, and wherein the weight of the film is from 0.02 to 0.15 psf.

In another aspect, the invention provides methods for producing thermosetting adhesive films with improved hot/wet properties at high temperature by coating one of the thermosetting adhesive compositions disclosed herein onto a release paper at a temperature and weight sufficient to form a film.

In still another aspect, the invention provides processes for bonding a first article and a second article, by providing a thermosetting adhesive composition or a thermosetting adhesive film as described herein as a point of contact between a surface of the first and second article, and curing the thermosetting adhesive composition or thermosetting adhesive film while in contact with surface of the first and second article, thereby bonding the first and second article.

These and other objects, features and advantages of this invention will become apparent from the following detailed description of the various aspects of the invention taken in conjunction with the accompanying Figures and Examples.

DETAILED DESCRIPTION OF CERTAIN EMBODIMENTS OF THE INVENTION

Figure 1:
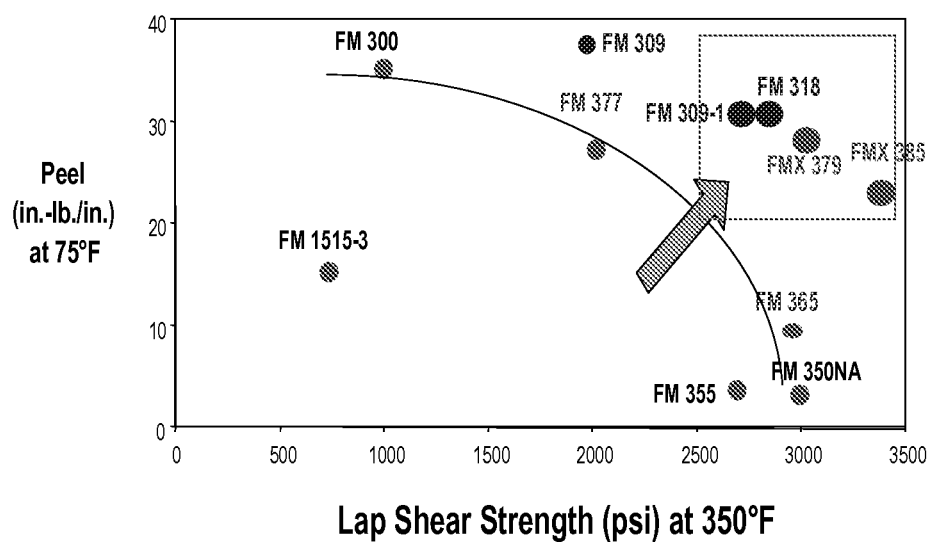
FIG. 1 illustrates Peel (or toughness) as a function of Lap Shear Strength (shear properties) at high temperatures. As depicted, the curve represents a drop in the peel/toughness as the shear properties are increased at high temperatures. The compositions according to the invention as described and claimed herein are depicted beyond the curve, thereby showing a paradigm shift in properties as compared to compositions of the prior art.
Figure 2:
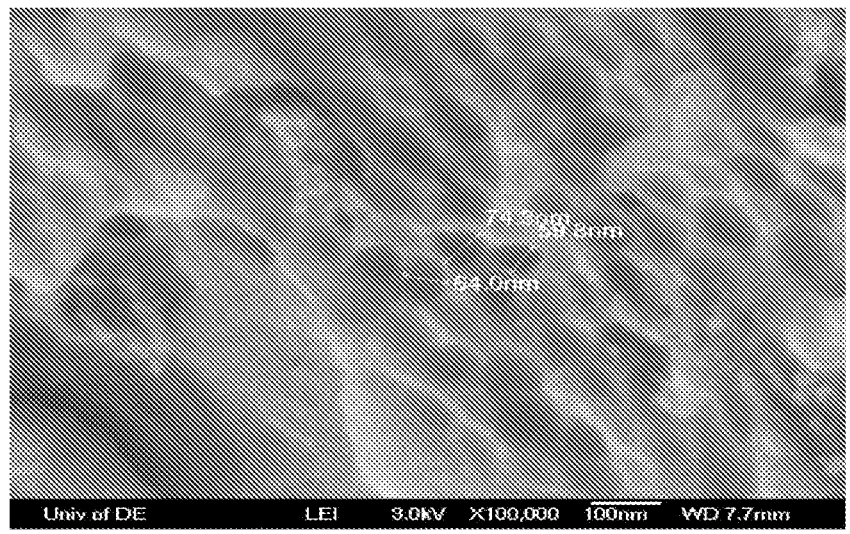
FIG. 2 illustrates a scanning electron microscopy of the fracture surface and morphology of one of the compositions described herein. The fractured surface shows the particle size to be less than 100 nm.

As summarized above, the discovery relates to thermosetting adhesive compositions containing an epoxy resin containing nano core-shell particles in combination with elastomers and/or thermoplastics, which can be thermally cured with amine curing agents to provide thermosetting adhesive compositions having high toughness and high temperature shear properties. In addition to the unexpected increase in higher temperature properties with improved toughness, these compositions are also characterized by high glass transition temperatures and low water absorption making these compositions suitable for demanding environments that require high performance, such as for the aerospace and automotive industries.

Epoxy Resins

The preferred thermoset resin formulations used for the present invention will be based on the epoxy resins, which are well known to those of ordinary skill in the art. The epoxy resins that can be employed for the present invention are curable epoxy resins having a plurality of epoxy groups per molecule. In general, a large number of glycidyl ethers having at least about two epoxy groups per molecule are suitable as epoxy resins for the compositions of this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. In one embodiment, the epoxy resin includes EPON 828. Such resins are commonly employed for producing adhesive and/or composite materials and are readily available from commercial sources. Other suitable polyphenols as the basis for the polyglycidyl ethers are the known condensation products of phenol and formaldehyde or acetaldehyde of the novolac resin-type.

Other polyepoxides that are in principle suitable are the polyglycidyl ethers of polyalcohols, aminophenols or aromatic diamines. Particular preference is given to the liquid epoxy resins derived by reaction of bisphenol A or bisphenol F and epichlorohydrin. The bisphenol based epoxy resins that are liquid at room temperature generally have epoxy equivalent weights of from 150 to about 200. The epoxy resins that are solid at room temperature may also or alternatively be used and are likewise obtainable from polyphenols and epichlorohydrin and have melting point of from 45 to 130° C., preferably from 50 to 80° C. Typically, the composition may contain from about 25 to about 90 weight percent (e.g., 25, 30, 35, 40, 45, 50, 55 weight percent) of epoxy resin (unless otherwise stated, all concentrations set forth herein are expressed in terms of the weight percent of the component in question based on the adhesive composition as a whole).

Any of these resins can serve as the resin containing, or predispersed with, nano core-shell particles in the prereact component, or as the second epoxy resin of the thermosetting composition. Particularly preferred epoxy resins for use as the second epoxy resin include the novolacs (including, but not limited to Tactix 71756 by Huntsman), polyglycidyl derivatives of amines and aminophenols including, for example, p-aminophenol, aniline, phenylenediamine, and 4,4'-methylenedianiline. Commercially available forms of polyglycidyl ethers of methylene dianiline include MY 9655 by Huntsman.

As described in further detail below, the epoxy resins are not used alone, but are combined with suitable curing agents, catalysts, rheology control agents, tackifiers, fillers, elastomeric toughening agents, reactive diluents, soluble thermoplastics and other additives well known to those skilled in the art.

Core-Shell Particles

Particles having a core-shell structure are an additional component of the compositions of the present invention. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure soft core, hard shell, soft shell, hard shell). Either the core or the shell or both the core and the shell may be crosslinked (e.g., ionically or covalently), as described, for example, in U.S. Pat. No. 5,686,509 (incorporated herein by reference in its entirety). The shell may be grafted onto the core. The polymer comprising the shell may bear one or more different types of functional groups (e.g., epoxy groups, carboxylic acid groups) that are capable of interacting with other components of the compositions of the present invention. In other embodiments, though, the shell is free of functional groups capable of reacting with other components present in the composition. Typically, the core will comprise from about 50 to about 95 percent by weight of the particles while the shell will comprise from about 5 to about 50 percent by weight of the particles.

Preferably, the elastomeric particles are relatively small in size. For example, the average particle size may be from about 30 nm to about 120 nm. In certain embodiments of the invention, the particles have an average diameter of less than about 80 nm. In other embodiments, the average particle size is less than about 100 nm. For example, the core-shell particles may have an average diameter within the range of from 50 to about 100 nm.

Methods of preparing various elastomeric particles having a core-shell structure are well-known in the art and are described, for example, in U.S. Pat. Nos. 3,985,703, 4,180,529, 4,315,085, 4,419,496, 4,778,851, 5,223,586, 5,290,857, 5,534,594, 5,686,509, 5,789,482, 5,981,659, 6,111,015, 6,147,142 and 6,180,693, 6,331,580 and published U.S. application 2005-124761, each of which is incorporated herein by reference in its entirety. Elastomeric particles having a core-shell structure are also available from several commercial sources. The following core-shell particles are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120° C., and a primary particle size of about 100 nm, the core-shell rubber particles available from Rohm & Haas under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns; the core-shell rubber particles sold under the tradename DEGALAN by Roehm GmbH or Roehm America, Inc. (e.g., DEGALAN 4899F, which is reported to have a glass transition temperature of about 95° C.); the core-shell rubber particles sold by Nippon Zeon under the tradename F351; and the core-shell rubber particles sold by General Electric under the tradename BLENDEX.

Elastomeric particles having a core-shell structure may be prepared as a masterbatch where the particles are dispersed in one or more epoxy resins such as a diglycidyl ether of bisphenol A. For example, the particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in European Patent Application EP 1632533, incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch. Other methods for preparing masterbatches of elastomeric particles having a core-shell structure stably dispersed in an epoxy resin matrix are described in U.S. Pat. Nos. 4,778,851 and 6,111,015, each incorporated herein by reference in its entirety. Preferably, the particles are stably dispersed in the epoxy resin matrix, i.e., the core-shell particles remain as separated individual particles with little or no agglomeration of the particles or precipitation (settling) of the particles from the masterbatch as the masterbatch is aged by standing at room temperature. The shell of the elastomeric particles may advantageously be functionalized to improve the stability of the masterbatch, although in another embodiment the shell is non-functionalized (i.e., does not contain any functional groups that react with any of the other components of the adhesive composition (such as the epoxy resin or curing agent) when that composition is cured). Particularly suitable dispersions of particles having a core-shell structure in an epoxy resin matrix are available from Kaneka Corporation, and include, for example, KANE ACE MX 120®.

The elastomeric particles having a core-shell structure can be produced by any method known in the art, such as emulsion polymerization, suspension polymerization, micro-suspension polymerization and the like. In particular, a process involving emulsion polymerization is preferred. In the embodiment of the invention where the core-shell particles are to be introduced into the adhesive composition in the form of a masterbatch in epoxy resin, the concentration of the rubber particles is not particularly limited. The epoxy resin(s) used to prepare the materbatch may be the same as, or different from, the epoxy resin(s) introduced separately into the composition. In one embodiment, all of the epoxy resin of the adhesive composition of the present invention is introduced in the form of a masterbatch together with the core-shell particles. Assuming that the total amount of the epoxy resin and rubber particles in the masterbatch is 100% by weight, the content of the core-shell particles may be, for example, 0.5 to 80% by weight, preferably 1 to 70% by weight, more preferably 3 to 60% by weight, still more preferably 20 to 40% by weight. In one embodiment, the weight percentage of the epoxy resin containing, or predispersed with, nano core-shell particles is from 40% to 50% of the total weight of the thermosetting composition.

In the inventive formulations, use of these core shell rubbers allows for toughening to occur in the formulation, irrespective of the temperature or temperatures used to cure the formulation. That is, because of the two phase separation inherent in the formulation due to the core-shell rubber—as contrasted for instance with a liquid rubber that is miscible or partially miscible or even immiscible in the formulation and can solidify at temperatures different than those used to cure the formulation—there is a minimum disruption of the matrix properties, as the phase separation in the formulation is often observed to be substantially uniform in nature. In addition, predictable toughening—in terms of temperature neutrality toward cure—may be achieved because of the substantial uniform dispersion.

Many of the core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 weight percent of the core-shell particle), available from Wacker Chemie GmbH.

Typically, the adhesive composition may contain from about 5 to about 25 weight percent (in one embodiment, from about 8 to about 20 weight percent) elastomeric particles having a core-shell structure. Combinations of different core-shell particles may advantageously be used in the present invention. The core-shell particles may differ, for example, in particle size, the glass transition temperatures of their respective cores and/or shells, the compositions of the polymers used in their respective cores and/or shells, the functionalization of their respective shells, and so forth. A portion of the core-shell particles may be supplied to the adhesive composition in the form of a masterbatch wherein the particles are stably dispersed in an epoxy resin matrix and another portion may be supplied to the adhesive composition in the form of a dry powder (i.e., without any epoxy resin or other matrix material). For example, the adhesive composition may be prepared using both a first type of core-shell particles in dry powder form having an average particle diameter of from about 0.1 to about 10 microns (more preferably, from about 0.2 to about 2 microns) and a second type of core-shell particles stably dispersed in a matrix of liquid bisphenol A diglycidyl ether at a concentration of from about 5 to about 50 weight % and having an average particle diameter of from about 25 to about 100 nm. The weight ratio of first type: second type core-shell rubber particles may be from about 1.5:1 to about 0.3:1, for example. The core-shell rubber sold by Nippon Zeon under the trade name F351 may, for example, be utilized as the first type of core-shell rubber particles and the core-shell rubbers sold by Kaneka Corporation under the trade names KANACE MX120® and KANACE MX156® may, for example, be utilized as the source of the second type of core-shell rubber particles.

Toughening Agents

Suitable toughening agents may be selected from a wide variety of substances, but generally speaking such materials are polymeric or oligomeric in character, and have functional groups such as epoxy groups, carboxylic acid groups, amino groups and/or hydroxyl groups capable of reacting with the other components of the compositions of the present invention when the composition is cured by heating (although alternatively the toughening agents may be free of such reactive functional groups).

The epoxy-based prepolymers obtained by reacting one or more amine-terminated polymers such as amine-terminated polyethers and amino silane-terminated polymers with one or more epoxy resins represent a particularly preferred class of toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865, each of which is incorporated herein by reference in its entirety. Generally speaking, it will often be desirable to adjust the ratio of amine-terminated polyether:epoxy resin being reacted such that there is an excess of epoxy groups relative to amine groups such that the latter functional groups are completely reacted (i.e., the epoxy-based prepolymer contains essentially no free amine groups). Mixtures of di- and trifunctional amine-terminated polyethers may be used. Amine-terminated polyethers containing both oxyethylene and oxypropylene repeating units (e.g., copolymers of ethylene oxide and propylene oxide, with the copolymers having a block, capped or random structure) may also be utilized as the amino-terminated polyether. Preferably, the amino-terminated polyether contains at least two amine groups per molecule. Preferably, the amine groups are primary amine groups.

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether in the desired ratio. The reaction preferably is carried out at high temperature, preferably at 90° to 130° C., for example at approximately 120° C., for a duration of, e.g., three hours.

Other suitable toughening agents include amorphous polysulfones, i.e., those polymers that contain predominately ether and sulfone groups interspersed between arylene residues. Such polysulfones, sometimes called polyethersulfones, may be prepared by the processes taught in U.S. Pat. Nos. 4,175,175, and particularly 3,647,751, for example. Polysulfones containing ether and alkylene groups in addition to sulfone groups are predominately amorphous, and are suitable candidates for the practice of the subject invention. Such polysulfones (polyethersulfones) have glass transition temperatures Tg, of greater than 150° C., preferably greater than 175° C., and most preferably in excess of 190° C. The Tg of a preferred KM 180 amine terminated polyether sulfone (manufactured by Cytec Industries Inc., Woodland Park N.J.) is approximately 200° C.

In the preparation of the epoxy-based prereact, the following compounds may, for example, be used: linear amine-terminated polyoxyethylene ethers; linear amine-terminated polyoxypropylene ethers; trifunctional compounds; amino silane capped polymers; amine-terminated polyethersulfones; and amine terminated polysulfones. In the preferred embodiment, the amine terminated polyethersulfone can be KM 170 and/or KM 180 (available from Cytec Industries, Inc.).

Other tougheners or impact modifiers known in the epoxy adhesive art may be used in addition to the aforementioned prereacts derived by reaction of amine-terminated polymers or amino silane-terminated polymers with epoxy resins. Generally speaking, such tougheners and impact modifiers are characterized by having glass transition temperatures ranging from −30° C. to 300° C. Examples of such tougheners and impact modifiers include, but are not limited to: reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers. Other examples include polyimides such as Matrimid 9725 supplied by Huntsman, Polyetherimides such as Ultem supplied by GE and others.

Mixtures of different auxiliary impact modifiers/toughening agents may be used. The amount of auxiliary impact modifier/toughening agent in the curable compositions of the present invention may vary substantially but typically is from about 0.1 to about 20 weight percent, e.g. from about 5 to about 15 weight percent. In one embodiment, it is contemplated that the toughening agent is present from about 10% to about 15% by weight of the total.

In another embodiment, the thermosetting adhesive compositions provided herein include a second toughening agent chosen from carboxy-terminated acrylonitrile-butadiene copolymer, polyamides, polyimides, and amido-amides. The carboxy-terminated acrylonitrile-butadiene copolymer can include, for example, NIPOL 1472, whereas the polyamide can include, for example, nylon. Suitable polyimides are known to those of ordinary skill in the art and include, for example, those described in detail in U.S. Pat. No. 5,605,745. Particularly preferred are those polyimides which, because of the asymmetry of the dianhydride or diamine, particularly the latter, possess a lesser degree of crystallinity or are wholly amorphous. Polyimides based on BTDA and AATI are preferred. Such polyimides are available commercially under the trademark MATRIMID® 5218 from the Ciba-Geigy Corporation, and have an inherent viscosity of >0.62 dl/g when measured at 0.5 weight percent concentration in N-methylpyrrolidone at 25° C. The molecular weight of these most preferred polyimides is greater than 20,000 Daltons, preferably greater than 50,000 Daltons, and most preferably in the range of about 100,000 Daltons.

The cured composition provided by the present invention is capable of exhibiting high peel and shear strengths in the temperature range of −55° C. to +180° C. In the cured state, these adhesives display performance necessary for many end-use applications especially in the manufacture of aircraft structures and high end automobiles. The toughness of the resin matrix may be adjusted, for example, by varying functionality of epoxy resins (di- or tri or tetrafunctional) leading to change in the crosslink density. The toughness and shear properties of the cured adhesive, can be markedly improved by using an epoxy-based prereact of this invention, and other tougheners in combination with nano core-shell particles.

Curing Agents

By the term curing agent is meant a reactive component capable of either reacting with the epoxy functional group or polymerizing the epoxy functional group. Since the compositions of the present invention are preferably one-part or single-component compositions and are to be cured at elevated temperature, they also contain one or more curing agents (hardeners) capable of accomplishing cross-linking or curing of certain of the adhesive components when the adhesive is heated to a temperature well in excess of room temperature. That is, the hardener is activated by heating. The hardener may function in a catalytic manner or, in some embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, blocked amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethyl-ethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured. The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 1 equivalents of curing agent per one equivalent of epoxy molecule.

Generally, such curing agents have relatively low molecular weights and reactive functionalities which are phenolic hydroxyl, amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1-8 carbon atoms, ether, sulfone, ketone, carbonate, carboxylate, carboxamide and the like.

Particularly preferred are the amine functional polyarylenes wherein the connecting groups are alkylene, ether, sulfone, and ketone. Such polyarylenes and synthetic methods for preparing them may be found in U.S. Pat. Nos. 4,175,175 and 4,656,208 which are herein incorporated by reference. The molecular weights of the preferred curing agents is less than about 800, preferably less than about 600, and most preferably less than about 450. Particularly preferred as curing agents are 3,3'-diaminodiphenylsulfone and 4,4'-diaminodiphenylsulfone, especially the latter. Mixtures of these curing agents may also be utilized. Amino-hydrogen/epoxy group stoichiometry is preferably adjusted to a range between 0.5 and 1.1, more preferably between 0.7 and 1.0, and most preferably from about 0.8 to 1.0.

In one embodiment, the amine curing agent is a mixture of dicyandiamide (DICY) and bisurea and the composition is cured at 120° C. In another embodiment, the amine curing agent is a diaminodiphenylsulfone (DDS) and the curing temperature is 180° C. In certain embodiments, the curing agent is a combination of DICY and DDS.

Other Additives

The inventive compositions may also contain known fillers such as the various ground or precipitated chalks, quartz powder, alumina, metallic aluminum powder, aluminum oxide, zinc oxide, calcium oxide, silver flakes, dolomite, graphite, granite, carbon fibers, glass fibers, textile fibers, polymeric fibers, titanium dioxide, fused silica, nano and hydrophobic grade silica (e.g., TS720), sand, carbon black, calcium oxide, calcium magnesium carbonates, barite and, especially, silicate-like fillers of the aluminum magnesium calcium silicate type, for example wollastonite and chlorite. Typically, the compositions of the present invention may contain from about 0.5 to about 40 weight percent of fillers.

In another embodiment, the composition additionally contains one or more platy fillers such as mica, talc or clay (e.g., kaolin). The adhesive compositions according to the present invention may also contain other common adjuvants and additives, such as plasticizers, reactive and/or non-reactive diluents, flow auxiliaries, coupling agents (e.g., silanes), adhesion promoters, wetting agents, tackifiers, flame retardants, thixotropic and/or rheology control agents (e.g., fumed silica, mixed mineral thixotropes), ageing and/or corrosion inhibitors, stabilizers and/or coloring pigments. Depending on the requirements made of the adhesive application with respect to its processing properties, its flexibility, the required rigidifying action and the adhesive bond to the substrates, the relative proportions of the individual components may vary within comparatively wide limits.

For some end uses it may also be desirable to include dyes, pigments, stabilizers, thixotropic agents, and the like. These and other additives may be included in the thermosetting adhesive compositions described herein as needed and at levels commonly practiced in the composite art. Upon curing, the thermosetting adhesive compositions, inclusive of any such additives, will form a substantially single, continuous rigid phase.

Films

The inventive compositions disclosed herein can also be used as adhesive films suitable for bonding two or more substrates chosen from composite, metal, or honeycomb structures together. In one embodiment, the thermosetting composition is an adhesive film that has a weight of from 0.02 to 0.15 psf. Such films can further include a carrier such as a woven or knit mat, or a random mat, derived from glass, polyester, nylon, or other suitable polymeric materials. Such carriers are useful for controlling bondline thickness. The compositions of this invention can also be coated as unsupported films. The unsupported films are generally designed for reticulation onto the honeycomb or a perforated metal or composite sheet used in the acoustic applications for aircraft nacelles.

Methods

The resin system components of the present invention are mixed and blended in accordance with the conventional methods known to those skilled in the epoxy resin art. The toughened epoxy resin systems of the present invention can be used as film adhesives, or as matrix resins for the preparation of fiber reinforced prepregs, for which methods are known to those of skill in the composite arts.

Accordingly, in one aspect the invention provides methods for producing thermosetting adhesive films having improved hot/wet properties at high temperatures by reacting a mixture containing an epoxy resin containing nano core-shell particles with at least one amine-terminated polysulfone or polyethersulfone at a temperature and time sufficient to form a prereact, adding at least one other epoxy resin and at least one amine curing agent to the prereact, and coating the resulting mixture onto a release paper at a temperature and weight sufficient to form a film.

In one embodiment, the reacting step is performed at 250-300° F. for a period of one-half to two hours. In a particular embodiment, the reacting step is performed at 300° F. for one (1) hour. In certain embodiments, the steps can be performed under a vacuum. Mixing and addition steps can be performed for a period of between 15 to 60 minutes.

In one embodiment, the coating step can be performed at from 100-200° F. and coated from 0.02-0.15 psf film weight. In a particular embodiment, the coating step is performed at a temperature of 150° F. and the film weight is 0.06 psf.

In some embodiments, the reaction mixture further includes a bisphenol and a catalyst for the bisphenol-epoxy reaction. At least one other epoxy resin and/or organic filler can also be included.

The inventive compositions are suitable for adhering together parts made of different materials (metallic or non-metallic), including, for example, wood, metal, coated or pretreated metal, plastic, filled plastic, thermoset materials such as sheet molding compound and fiberglass and the like, and honeycomb structures. The substrates to be joined using the adhesive may be the same as or different from each other. The inventive compositions can be applied to a substrate surface by any technique known in the art. Generally, the adhesive is applied to one or both of the substrates to be joined. The substrates are contacted such that the adhesive is located between the substrates to be bonded together. Thereafter, the adhesive composition is subjected to pressure and heating to a temperature and for a time at which the heat curable or latent curing agent initiates cure of the epoxy resin-containing composition.

Accordingly, in another aspect, the invention provides processes for bonding a first article and a second article by providing a thermosetting adhesive composition or adhesive film as described herein as a point of contact between a surface of the first article and a surface of the second article, and curing the joined articles at a temperature, pressure, and time sufficient to allow full cure of the thermosetting adhesive, thereby bonding the first and second articles together.

In one embodiment, the first and second articles can be metallic, non-metallic, monolithic, or sandwich structures and are chosen from composite, metal, and honeycomb structures. Thus, the articles bonded together can be composite/composite, metal/metal, composite/metal, honeycomb/metal, honeycomb/composite, and honeycomb/honeycomb. Exemplary metallic honeycomb structures include those made from titanium or aluminum. Exemplary non-metallic honeycomb structures include polyamide (Nomax/Kevlar), gloss-phenolic, and polyimide.

The curing step can be performed at a temperature from 325-400° F., a time from 60-120 minutes, and a pressure from 25-100 psi. In a particular embodiment, the curing step is performed at a temperature of 350° F. and 40 psi for 90 minutes.

Other Embodiments

1. A thermosetting adhesive composition comprising:
    a) a prereact composition formed through the reaction of:
        i) an epoxy resin containing nano core-shell particles;
        ii) at least one toughening agent chosen from: an amine terminated polyether sulfone, and amine terminated polysulfone; and
        iii) at least one multifunctional epoxy resin;
    and
    b) at least one amine curing agent to allow full cure of said adhesive composition at temperatures up to 400° F.,
   wherein said adhesive composition is characterized by high glass transition temperature, increased fracture toughness, and increased shear properties at temperatures up to 350° F.

2. A thermosetting adhesive composition according to embodiment 1, wherein the prereact composition further comprises:
    iv) a bisphenol and;
    v) a catalyst for the bisphenol-epoxy reaction.

3. A thermosetting adhesive composition according to embodiment 2, wherein the bisphenol is chosen from Bisphenol A, Bis F, Bis S, and fluorene.

4. A thermosetting adhesive composition according to any one of embodiments 2 or 3, wherein the catalyst is triphenyl phosphine.

5. A thermosetting adhesive composition according to any one of embodiments 1 to 4, wherein the epoxy resin containing nano core-shell particles is diglycidyl ether of bisphenol A.

6. A thermosetting adhesive composition according to any one of embodiments 1 to 5, wherein the size of the nano core-shell particles is from 10 to 100 nm.

7. A thermosetting adhesive composition according to any of the preceding embodiments wherein the nano core-shell comprises a butadiene core and a polymethyl methacrylate (PMMA) shell.

8. A thermosetting adhesive composition according to any of the preceding embodiments, wherein the nano core-shell comprises a butadiene-styrene copolymer core and a PMMA shell.

9. A thermosetting adhesive composition according to any of the preceding embodiments wherein the nano core-shell comprises a polysiloxane core and a PMMA shell.

10. A thermosetting adhesive composition according to any of the preceding embodiments, wherein the epoxy resin containing nano core-shell particles is KANE ACE® MX 120.

11. A thermosetting adhesive composition according to any of the preceding embodiments, wherein the toughening agent is a polyethersulfone with a molecular weight (Mn) of 8000 to 14000.

12. A thermosetting adhesive composition according to any of the preceding embodiments further comprising a second toughening agent chosen from carboxy terminated acrylonitirile-butadiene copolymer, polyamides, polyimides, and an amido-amide.

13. A thermosetting adhesive composition according to embodiment 12, wherein the carboxy terminated acrylonitirile-butadiene copolymer is NIPOL® 1472.

14. A thermosetting adhesive composition according to embodiment 12, wherein the polyamide is Nylon.

15. A thermosetting adhesive composition according to embodiment 12, wherein the polyimide is MATRIMID® 9725.
16. A thermosetting adhesive composition according to any of the preceding embodiments, wherein the multi-functional epoxy resin is chosen from tetra glycidyl ether of methylene dianiline, and a novolac epoxy.
17. A thermosetting adhesive composition according to embodiment 16, wherein the tetra glycidyl ether of methylene dianiline is MY9655, and wherein the novolac epoxy is Huntsman Tactix XP® 71756.
18. A thermosetting adhesive composition according to any of the preceding embodiments, wherein the amine curing agent is chosen from diamino diphenyl sulfone (DDS), dicyandiamide (DICY), blocked bisureas, amines, and mixtures thereof.
19. A thermosetting adhesive composition according to embodiment 18, wherein the amine curing agent is DICY/bisurea and wherein the curing temperature is 250° F.
20. A thermosetting adhesive composition according to embodiment 18, wherein the amine curing agent is DDS or a combination of DICY and DDS, and wherein the curing temperature is 350° F.
21. A thermosetting adhesive composition according to any of the preceding embodiments further comprising one or more inorganic filler chosen from: aluminum oxide, metallic aluminum powder, nano and hydrophobic grade silica, and calcium oxide or silver flakes.
22. A thermosetting adhesive composition according to any of the preceding embodiments further comprising one or more flow control agents chosen from: hydrophobic amorphous silica, and hydrophilic amorphous silica.
23. A thermosetting adhesive composition according to embodiment 22, wherein the hydrophobic amorphous silica is CAB-O-SIL® TS 720.
24. A thermosetting adhesive composition according to any of the preceding embodiments further comprising one or more pigments chosen from: $TiO_2$ and ZnO.
25. A thermosetting adhesive composition according to any of the preceding embodiments, wherein the weight percentage of the epoxy resin containing nano core-shell particles is from 40% to 50% of the total.
26. A thermosetting adhesive composition according to any of the preceding embodiments, wherein the weight percentage of the toughening agent is from 1% to 30% of the total.
27. A thermosetting adhesive composition according to any of the preceding embodiments, wherein the weight percentage of the multi-functional epoxy resin is from 5% to 25% of the total.
28. A thermosetting adhesive film suitable for bonding a substrate chosen from one or more of: a composite material, a metal, and a honeycomb structure, said film comprising a thermosetting adhesive composition according to any of embodiments 1 to 27, wherein the weight of the film is from 0.02 to 0.15 psf.
29. A thermosetting adhesive film according to embodiment 28 further comprising a polymeric carrier chosen from one or more of glass, polyester, and nylon.
30. A thermosetting adhesive film according to embodiment 28 or embodiment 29, wherein the film is produced via a hot/melt or solvated process.
31. A method for producing a thermosetting adhesive film having improved hot/wet properties at high temperature, the method comprising:
   a) reacting a mixture comprising an epoxy resin containing nano core-shell particles, and at least one amine-terminated polysulfone or polyethersulfone at a temperature and time sufficient to form a prereact;
   b) adding at least one other epoxy resin and at least one amine curing agent to the prereact; and
   c) coating the mixture of step (b) onto a release paper at a temperature and weight sufficient to form a film, thereby producing a thermosetting adhesive film having improved hot/wet properties at high temperatures.
32. A method according to embodiment 31, wherein the reacting step is performed at 250-300° F. for a period of 0.5 to 2 hours.
33. A method according to embodiment 32, wherein the temperature is 300° F. and the time is 1 hour.
34. A method according to any of embodiments 31 to 33, wherein steps (b) and (c) are performed under vacuum, and wherein the at least one other epoxy resin and amine curing agent are mixed with the prereact for a period of from 15 to 60 minutes.
35. A method according to any of embodiments 31 to 34, wherein step (c) is performed at from 100 to 200° F. and coated from 0.02 to 0.15 psf film weight.
36. A method according to embodiment 35, wherein the temperature is 150° F. and the film weight is 0.06 psf.
37. A method according to any one of embodiments 31 to 36, wherein the reaction mixture further comprises a bisphenol, a catalyst for the bisphenol-epoxy reaction, and at least one other epoxy resin.
38. A method according to any one of embodiments 31 to 37, wherein step (b) further comprises adding at least one inorganic filler to the reaction mixture.
39. A process for bonding a first article and a second article, the process comprising:
   a) providing a thermosetting adhesive composition according to any of embodiments 1 to 27, or a thermosetting adhesive film according to any of embodiments 28 to 30, or a thermosetting adhesive film prepared according to any of embodiments 31 to 38 as a point of contact between a surface of the first and second article; and
   b) curing the thermosetting adhesive composition or thermosetting adhesive film while in contact with surface of the first and second article at a temperature, pressure and time sufficient to allow full cure, thereby bonding the first and second article.
40. A process according to embodiment 39, wherein the first and second article (first article/second article) are chosen from composite/composite; metal/metal; composite/metal; metal/composite; honeycomb/composite; honeycomb/metal; and honeycomb/honeycomb.
41. A process according to embodiment 40, wherein the metal is chosen from titanium and/or aluminum.
42. A process according to embodiment 40, wherein the composite is chosen from polyamide and/or gloss-phenolic polyimide.
43. A process according to any one of embodiments 39 to 42, wherein step (b) is performed at a temperature from 325 to 400° F., a time of from 60 to 120 minutes, and a pressure of from 25 to 100 psi.
44. A process according to embodiment 43, wherein the temperature is 350° F., the pressure is 40 psi, and the time is 90 minutes.

EXAMPLES

The following examples are provided to assist one skilled in the art to further understand certain embodiments of the present invention. These examples are intended for illustration purposes and are not to be construed as limiting the scope of the various embodiments of the present invention.

Example 1

A mixture containing 80 g of KANACE MX 120® (supplied by Kaneka-contains 25% by weight of nano core shell rubber in EPON 828 epoxy resin), 20 g of tetra bromo bisphenol A (TBBA), 20 g of Paraloid 2691 (Rohm&Hass) and 0.1 g of triphenyl phosphine is reacted at 300° F. for one hour. The above prereacted mixture is cooled to 160° F. and 35 g of tetra glycidyl ether of methylene dianiline (MY 9655 supplied by Huntsman) is added and mixed under vacuum for 15 minutes. To this mix, curing agents diamino diphenyl sulfone 20 g and DICY 2.5, and flow control agent amorphous silica 2 g are added. The mix is stirred under vacuum for 15 minutes.

The above mix is coated onto a release paper at 150° F. at 0.06 psf film weight. The film is evaluated for mechanical performance by bonding and testing lap shear, peel and glass transition temperature. The film is cured at 350° F. for 90 minutes under 40 psi pressure.

Example 2

Same procedure as Example 1 is followed except KANACE MX 120® resin is replaced with 60 g of EPON 828® and 25 g of Paraloid 2691®. This prereacted mixture is then used with the additional epoxy resin and curing agents as described in Example 1. The mix is then coated as a film and tested for mechanical performance as indicated in Example 1.

Test Results showing the unexpected performance improvement seen with the use of KANACE MX 120® resin are shown in Table 1.

TABLE 1

| Property | Example 1 (KANACE MX 120 ®) | | | Example 2 (EPON 828 ®) | | |
|---|---|---|---|---|---|---|
| | 75° F. | 250° F. | 285° F. | 75° F. | 250° F. | 285° F. |
| Lap Shear on Aluminum Substrates (psi) tested per ASTM D1002 | 4894 | 4074 | 3606 | 3892 | 3554 | 2622 |
| Metal to Metal Peel (pli), tested per ASTM D1763 at 75° F. | | 39 | | | 28 | |
| Glass Transition Temperature (° C.) | | 165 | | | 165 | |

Example 3

A mixture of KANACE MX 120® 80 g and KM Polymer 10 (polyethersulfone) is reacted at 250° F. for one hour. To this prereact, novolac epoxy 50 g is added followed by the curing agents as in Example 1 and 15 g of KM 180 polymer. The film is coated and tested for mechanical properties on aluminum substrates as indicated in Example 1. The comparative formulation without KANACE MX 120® resin is shown in Example 4.

Example 4

Same procedure as Example 3 is followed, except the prereact consists of EPON 828® 60 g, Paraloid 2691® 20 g (to replace KANACE MX 120® resin) and 10 g of KM 180. The rest of the formulation is the same as in Example 3. The film is coated at 0.05 psf and tested for mechanical properties. The comparative test data between KANACE MX 120® containing resin system and its replacement (EPON 828®+Paraloid 2691®) is shown in Table 2.

TABLE 2

| Property | Example 3 (KANACE MX 120 ® resin-EPON 828 ® + CSR at 25% by weight) | | | Example 4 (EPON 828 ® + Paraloid 2691 ®) | | |
|---|---|---|---|---|---|---|
| | 75° F. | 250° F. | 350° F. | 75° F. | 250° F. | 350° F. |
| Lap Shear (psi) on aluminum substrates | 4500 | 4500 | 2200 | 3505 | 2925 | 780 |
| M-M Peel (pli) @ 75° F. | | 30 | | | 25 | |

As can be seen from the data in Table 2, the nano core-shell rubber particle containing formulation (Example 3) shows not only higher peel but also unexpected higher shear properties at elevated temperatures.

Example 5

Same procedure as Example 3 is followed. The adhesive film coated at 0.05 psf with a random mat carrier is then used to bond CYCOM 977-2 epoxy/carbon composite substrates. For co-bonded, wide area lap shear studies, one 8-10 ply composite skin (adherend) is pre-cured at 350° F. and the other adherend 8-10 plies is co-cured with the adhesive film as shown below:

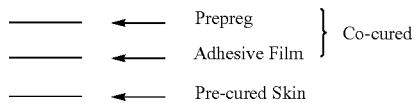

For the secondary bonding studies both adherends are pre-cured. For the co-bonding studies, the cure cycle consists of 2 hours at 350° F. and 85 psi. For the secondary bonding studies, the cure cycle is 90 minutes at 350° F. with 40 psi pressure. After bonding, the specimens are then tested per ASTM D 3165 before and after 2000 hour water soak at 160° F. Lap shear test results are shown in Table 3.

TABLE 3

| | 23° C. | 23° C./wet | 121° C. | 121° C./wet |
|---|---|---|---|---|
| Co-bonded | 5220 psi | 5075 psi | 3710 psi | 3200 psi |
| Secondarily Bonded | 6000 psi | 6090 psi | 4500 psi | 4200 psi |

The data in Table 3 shows that compositions of Example 5 are characterized by high shear strength under both dry and wet conditions indicating excellent resistance to moisture. The retention of properties after exposure to humidity is greater than 90% in the secondarily bonded specimens and greater than 85% in the co-bonded specimens. This data indicates that compositions of this invention are not affected by the moisture and retain most of their strength after long term exposures to water soak conditions.

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the invention as claimed without undue experimentation.

Although the foregoing description has shown, described, and pointed out the fundamental novel features of the present teachings, it will be understood that various omissions, substitutions, and changes in the form of the compositions and processes as illustrated and described, may be made by those skilled in the art, without departing from the scope of the present teachings. Consequently, the scope of the present teachings should not be limited to the foregoing description, but should be defined by the appended claims.

The invention claimed is:

1. A thermosetting adhesive composition comprising:
   a) a prereact formed by reacting a mixture comprising:
      i) nano core-shell particles having particle sizes within the range of 10 nm to 100 nm;
      ii) an amine terminated polyether sulfone;
      iii) at least one multifunctional epoxy resin;
      iv) a bisphenol; and
      v) a catalyst for bisphenol-epoxy reaction; and
   b) at least one amine curing agent to allow full cure of said adhesive composition at temperatures up to 400° F.,
   wherein, upon curing, said adhesive composition is characterized by high glass transition temperature, increased fracture toughness, and increased shear properties at temperatures up to 350° F.

2. A thermosetting adhesive composition according to claim 1, wherein the amine terminated polyethersulfone has a molecular weight (Mn) of 8000 to 14000.

3. A thermosetting adhesive composition according to claim 1 further comprising a second toughening agent chosen from a group consisting of: carboxy terminated acrylonitirile-butadiene copolymer, polyamides, polyimides, and an amido-amide.

4. A thermosetting adhesive composition according to claim 1 further comprising a second multi-functional epoxy resin chosen from tetra glycidyl ether of methylene dianiline, and a novolac epoxy.

5. A thermosetting adhesive composition according to claim 1, wherein the amine curing agent is chosen from a group consisting of: diamino diphenyl sulfone (DDS), dicyandiamide (DICY), bisureas, amines, and mixtures thereof.

6. A thermosetting adhesive composition according to claim 5, wherein the amine curing agent is a combination of DICY and bisurea.

7. A thermosetting adhesive composition according to claim 5, wherein the amine curing agent is DDS or a combination of DICY and DDS.

8. A thermosetting adhesive composition according to claim 1 further comprising at least one of: i) an inorganic filler chosen from one or more of: aluminum oxide, metallic aluminum powder, silica, calcium oxide, and silver flakes; ii) a flow control agent chosen from one or more of: hydrophobic amorphous silica, and hydrophilic amorphous silica; and iii) a pigment chosen from one or more of: $TiO_2$ and ZnO.

9. A thermosetting adhesive film suitable for bonding a substrate chosen from one or more of: a composite material, a metal, and a honeycomb structure, said film comprising a thermosetting adhesive composition according to claim 1, wherein the weight of the film is from 0.02 to 0.15 psf.

10. A supported thermosetting adhesive film comprising the thermosetting adhesive film according to claim 9 formed on a carrier, which is derived from glass or polymeric material.

11. A process for bonding a first article and a second article, the process comprising:
   a) providing a thermosetting adhesive composition according to claim 1 as a point of contact between a surface of the first and second article; and
   b) curing the thermosetting adhesive composition while in contact with surface of the first and second article at a temperature, pressure and time sufficient to allow full cure, thereby bonding the first and second article.

12. A process according to claim 11, wherein the first article and second article (first article/second article) are chosen from: composite/composite; metal/metal; composite/metal; metal/composite; honeycomb/composite; honeycomb/metal; and honeycomb/honeycomb.

13. A process according to claim 11, wherein step (b) is performed at a temperature from 325° F. to 400° F., a time of from 60 minutes to 120 minutes, and a pressure of from 25 psi to 100 psi.

14. A method for producing a thermosetting adhesive film having improved hot/wet properties at high temperature, the method comprising:
   a) reacting a mixture comprising: nano core-shell particles having particle sizes within the range of 10 nm to 100 nm; at least one multifunctional epoxy resin; a bisphenol; a catalyst for bisphenol-epoxy reaction; and amine-terminated polyethersulfone at a temperature and time sufficient to form a prereact;
   b) adding at least one other epoxy resin and at least one amine curing agent to the prereact; and
   c) coating the mixture of step (b) onto a release paper at a temperature and weight sufficient to form a thermosetting adhesive film having improved hot/wet properties at high temperatures.

15. A method according to claim 14, wherein the reacting step is performed at 250° F.-300° F. for a period of 0.5 to 2 hours.

16. A method according to claim 14, wherein step (c) is performed at from 100° F. to 200° F. and coated from 0.02 psf to 0.15 psf film weight.

17. A method according to claim 14, wherein step (b) further comprises adding at least one inorganic filler to the mixture.

* * * * *